March 23, 1948.  J. H. HAMNER ET AL  2,438,393
MACHINE FOR PICKING COTTON
Filed Aug. 12, 1946  3 Sheets-Sheet 1

Inventor
James H. Hamner
James C. Hamner
Lloyd H. Hamner,
By Nash & Hatfield Attorneys

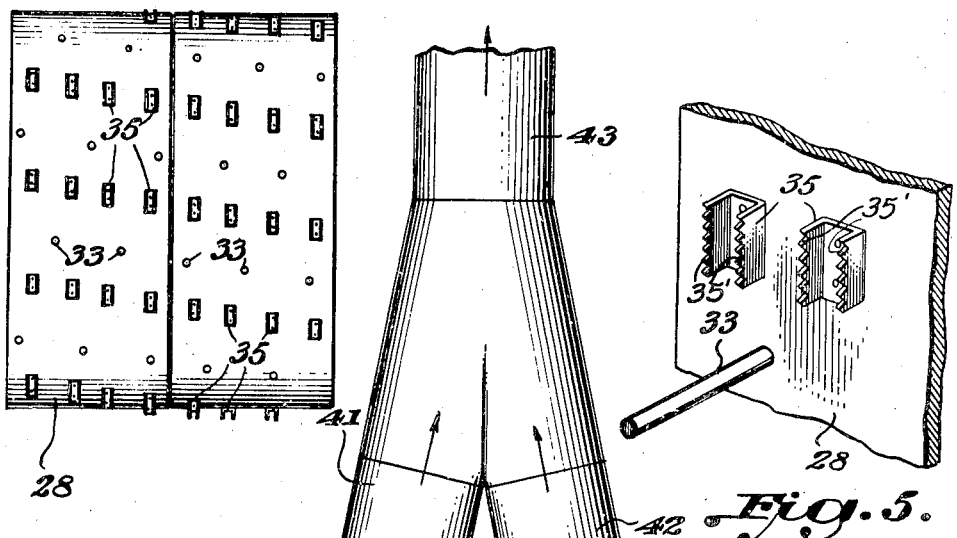
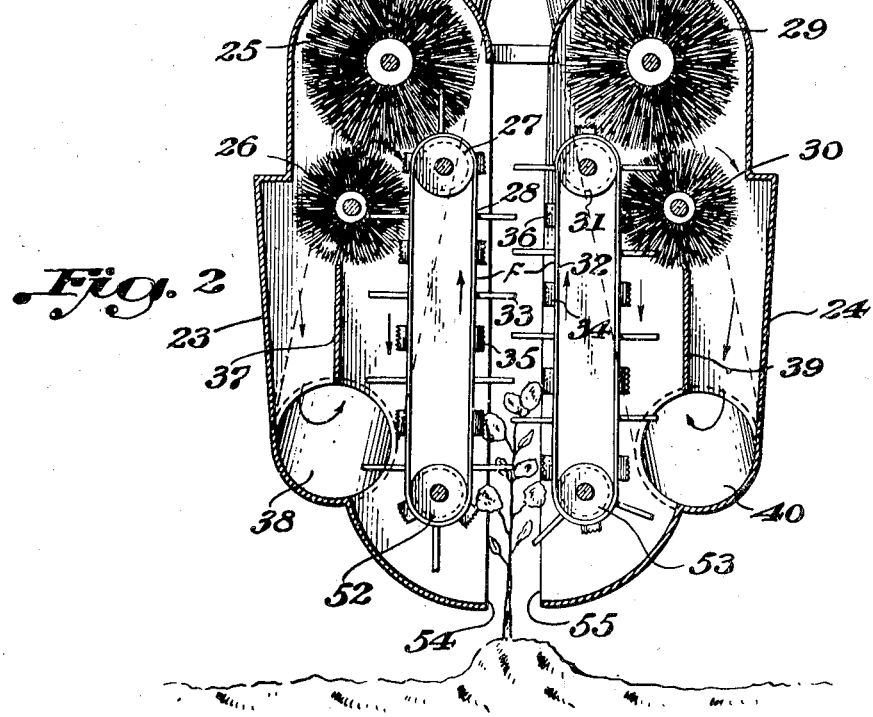

March 23, 1948.  J. H. HAMNER ET AL  2,438,393
MACHINE FOR PICKING COTTON
Filed Aug. 12, 1946    3 Sheets-Sheet 3

Inventor
James H. Hamner
James C. Hamner
Lloyd H. Hamner,
By Nason & Hatfield Attorneys.

Patented Mar. 23, 1948

2,438,393

UNITED STATES PATENT OFFICE 2,438,393

MACHINE FOR PICKING COTTON

James Henry Hamner, James Carl Hamner, and Lloyd Henry Hamner, Clarksdale, Miss.

Application August 12, 1946, Serial No. 690,064

13 Claims. (Cl. 56—49)

This invention relates to a machine for picking cotton from a row of cotton stalks in a field. The machine proceeds down a row of cotton stalks, removing the cotton from the stalks by means of opposed power driven belts having substantially opposed spindles and members with tooth means on the upwardly traveling belt flights, which belts convey the cotton upwardly, where it is removed by suitable means and conveyed to a receptacle. The invention particularly relates to the arrangement and location of the cotton removing devices located on the belts, and the mechanism for removing the cotton from the belts and transferring it to a position where the cotton may be conveyed to the receptacle as well as the location of the receptacle on the machine. Other attempts have been made to pick cotton from rows of stalks, but such attempts have resulted in only partially removing the cotton from the stalks, leaving some of the cotton remaining on the stalks. The machine of the present invention removes all of the cotton from the stalks in a field of cotton leaving the bare stalks standing without any cotton remaining on the stalks, and removes none of the stalks.

An object of the invention is to provide a cotton picker which picks the stalks clean because of the improved picking means mounted on the opposed upwardly moving flights of belts.

Another object is to provide improved cotton removing means especially adapted to remove the bolls from the cotton picking means on the belts and deposit the cotton where it may be readily conveyed to the receptacle on the machine.

Other objects will appear hereinafter throughout the specification.

In the drawings:

Figure 2 is a front elevation of the cotton picking means with the casing shown in section.

Figure 5 is an enlarged perspective view, partly broken away, of one of the elevating belts, and Figure 6 is a side elevation of a pair of belts showing a preferred arrangement of cotton removing and elevating mechanism.

Figure 1:
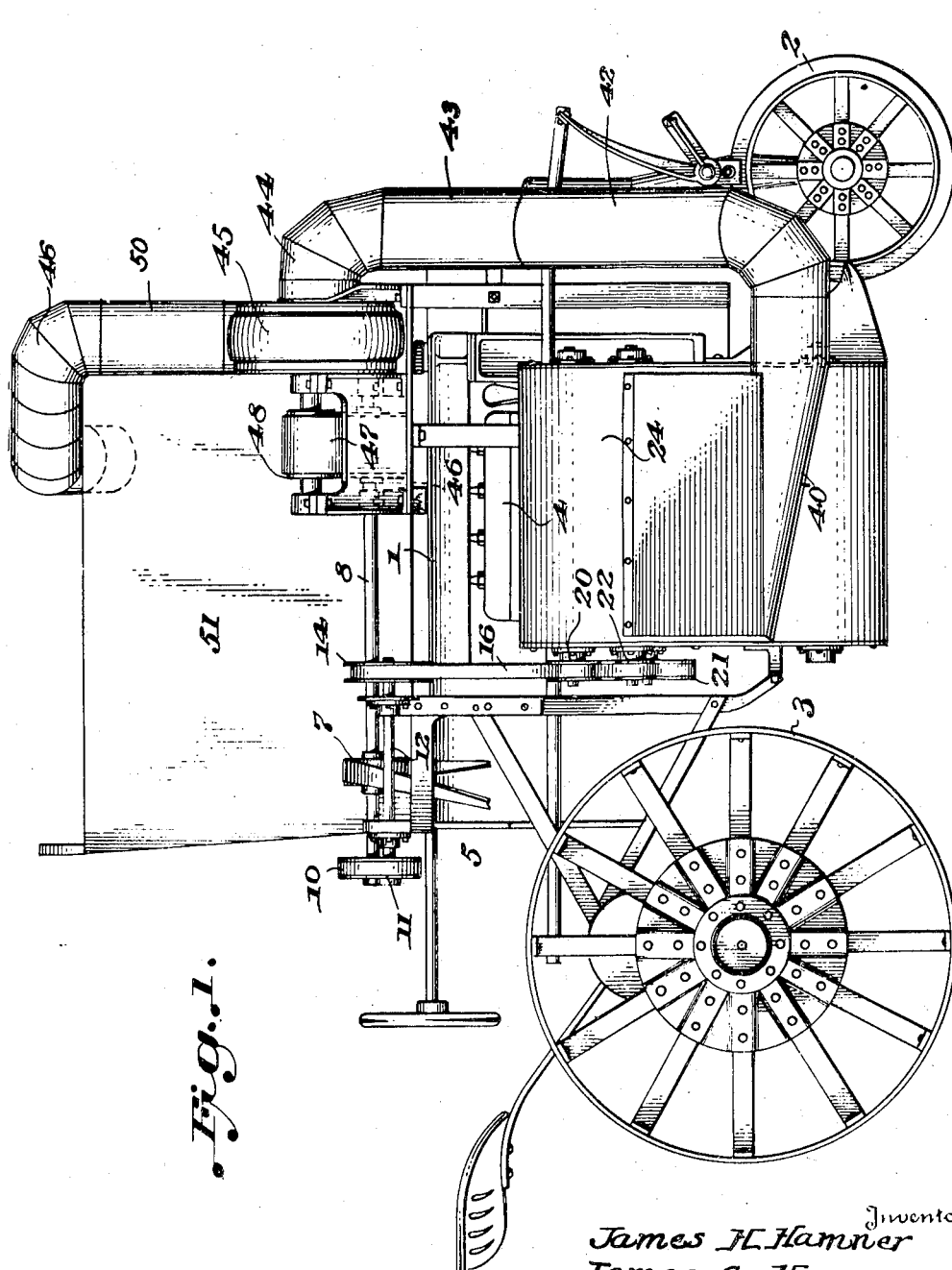
Figure 1 is a side elevation of the machine.

As shown in the drawings our machine for picking cotton preferably consists of a tractor which moves over the ground and is guided so that cotton on the rows of cotton stalks is engaged by means on oppositely arranged spindles and members having tooth means that are in opposed relation to each other on the flights of upwardly moving belts which remove the cotton from the stalks and elevate it to brushes, which latter cause the cotton to fall into a receptacle where the cotton is elevated pneumatically to a container. The mechanism for removing the cotton and for pneumatically elevating the cotton after it has been picked to the container are both driven by a power off-take from the tractor.

The tractor is indicated by the numeral 1, and is provided with front and rear wheels 2 and 3, respectively. The tractor is provided with a power plant such as a motor 4.

Figure 4:
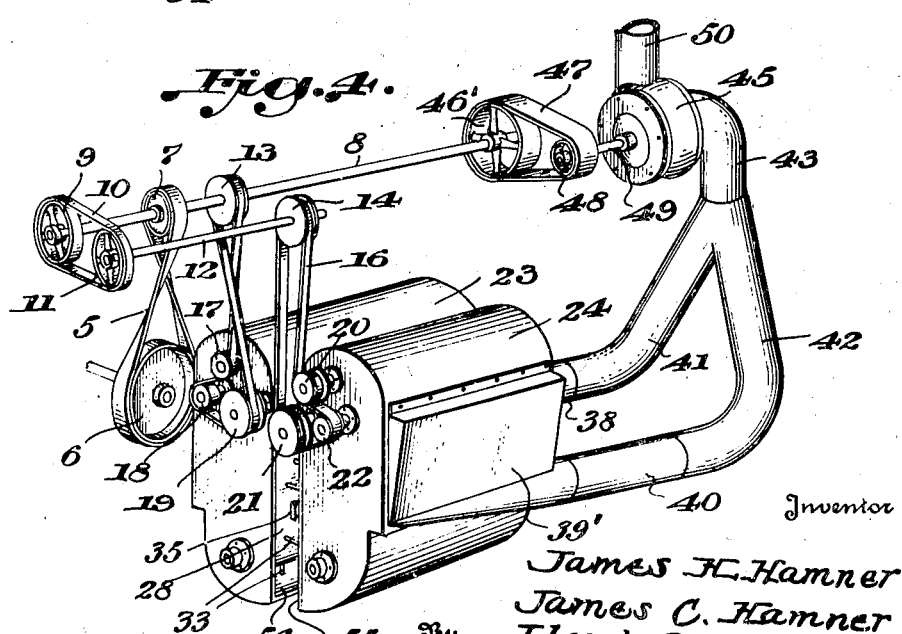
Figure 4 is a perspective view of the driving mechanism, cotton removing means and elevating mechanism.

As seen in Figure 4 the belt 5 is driven by a power off-take indicated by the pulley 6 from the motor 4. This belt drives the pulley 7 of the drive shaft 8. One end of this drive shaft has a pulley 9 which drives a belt 10 for driving the pulley 11 on the shaft 12.

The numerals 13 and 14 indicate pulleys mounted on shafts 8 and 12, respectively, which drive cotton picker driving belts 15 and 16, as viewed in Figure 4 which is a perspective view of the rear of the picking mechanism.

The belt 15 drives the upper brush pulley 17, cotton elevating belt pulley 19 and lower brush pulley 18, of the left-hand unit 23. The right-hand unit 24 is driven by belt 16 which drives the upper brush pulley 20, elevating belt pulley 21 and lower brush pulley 22.

The units 23 and 24 are identical and by reference to Figures 2 and 3, 5 and 6, it will be seen that the unit 24 houses within its casing the upper brush 25 which is driven by the pulley 20 and the lower brush 26, slightly smaller than the upper brush which latter is driven by the pulley 22. Also located within this casing is the driving pulley 27 mounted on the same shaft with the pulley 21 which drives the belt 28 which is trained over the idle pulley 52.

The other unit is provided with upper brush 29 driven by pulley 17, lower brush 30 driven by pulley 18 and driving pulley 31 for belt 32 that is trained over this belt, and idle pulley 53 is driven from pulley 19.

Figure 3:
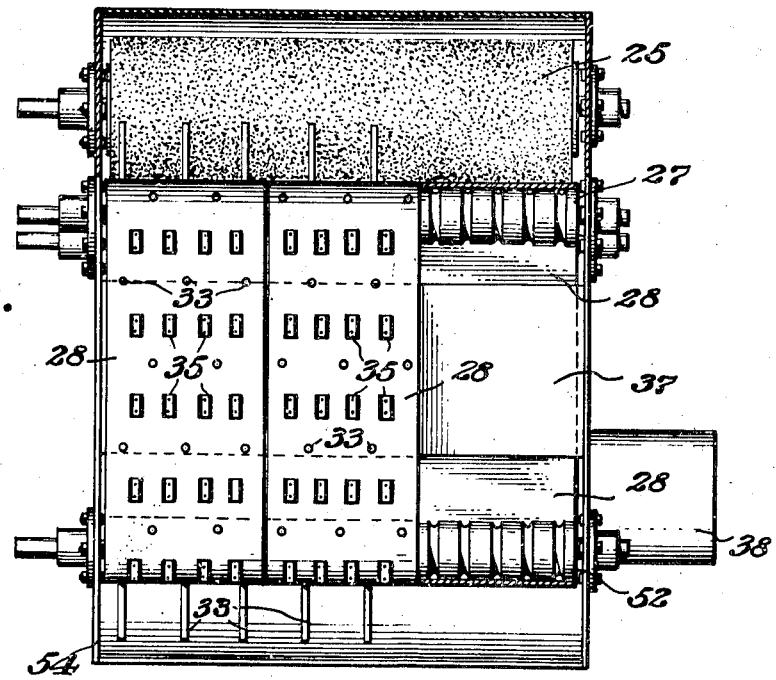
Figure 3 is a side elevation of the cotton picking means, certain of the parts being shown in section.

As more particularly shown in Figures 3, 5 and 6 each belt may be conveniently in three sections but we may use a single belt in place of the three belts of each of the units.

As shown in Figures 3, 5 and 6 these belts are provided with a series of symmetrically mounted spindles 33 forming rows across the belts.

Each row of spindles alternates with a row of members having tooth means 34, 35 and 36. In Figure 3 the rows of members and spindles have been shown as being mounted in horizontal rows, but we preferably locate these spindles and members in diagonally arranged rows as shown in Figure 6. It should be understood that where three belts are used in each unit these belts are connected to each other in a manner (not shown) such that the arrangement of the rows of spindles and members will not become disaligned. Each of the members is of general U-shaped configuration so as to provide two rows of teeth, as shown in Figure 5, but other forms of members having teeth may be substituted for the exact form shown.

When the spindles and members having sharpened edges, or saw-teeth, are arranged as shown in Figures 3 and 5 it will be appreciated that these parts are located in diagonal rows, and that the spindles on the upwardly traveling flight of one belt are opposed by the members on the upwardly traveling flight of the other belt, as shown in Figure 2. For instance, referring to the uppermost left-hand spindle shown in Figure 3, it will be noted that a member occupies a position below and to the right of this spindle, and that alternately a second spindle occupies a position below and to the right of a member, and below this second spindle is a second member below and to the right of it and so on down, thus forming a series of diagonal rows of alternating spindles and members.

In our preferred form of cotton elevating belt, as shown in Figure 6, it will be noted that rows of diagonal alternating spindles and members having tooth means, [hereinafter referred to as saw-toothed members] are shown, and additionally the rows of spindles and alternating rows of saw-toothed members are arranged slightly diagonal to a horizontal line passing through the belts. In other words in our preferred construction there are diagonal rows of spindles alternating with saw-toothed members, and additionally each row of saw-toothed members and its alternating row of spindles is arranged at a slight angle to a line which forms a right angle with the direction of movement of the belts.

The upwardly moving flights of the belts are indicated by F in Figure 2.

The teeth of the members are indicated at 35' in Figure 5.

The cotton picker units 23 and 24 are provided with vertical partitions 37 and 39, respectively, located slightly to one side of the lower brushes 26 and 30, and these partitions form receptacles 38 and 40 having side walls 39' and 40' for the reception of the picked cotton which is deposited by the lower brushes. This cotton, as it is deposited in the receptacles 38 and 40, is elevated in pipes 41 and 42 which join at 43. Pipe 43 is provided with a bend 44 which leads to the intake of the pneumatic blower 45 that produces suction in the receptacles 38 and 40. The exit of the blower 45 is connected to pipe 50 having a bend 46 leading to the container 51. The blower 45 is driven by means of a pulley 46' mounted on the drive shaft 8, which pulley drives the belt 47 that is trained over driven pulley 48 mounted on the shaft 49 of the blower.

By reference to Figures 2 and 4 it will be noted that the cotton picker units 23 and 24 are spaced from each other and each is provided with a cut-out side 54, and 55 so that the spindles may extend toward each other alternately, as shown in these figures. It will also be understood that the spindles slightly overlap each other, i. e., they extend through a vertical line passing midway between these casings.

One of the most important features of our invention is the arrangement and construction of spindles and saw-toothed members. We have found that the arrangement of spindles and saw-toothed members alternately in diagonal lines is of paramount importance in removing all of the bolls from a row of cotton stalks. It is also very important to mount the spindles so that they overlap each other alternately in a vertical line, particularly as shown in Figure 2.

The construction shown in Figure 6, where alternate rows of spindles and saw-toothed members are arranged slightly inclined to a horizontal line extending at a right angle to the movement of the belts, and the spindles on one upwardly moving belt flight opposing the saw-tooth members are the most important features of our invention. The arrangement on diagonal lines of alternate spindles and saw-toothed members combined with the rows of saw-toothed members and rows of spindles slightly inclined to a line extending at a right angle to the movement of the belt insures the removal of all of the bolls from a row of cotton stalks as the machine proceeds down such row.

It will be understood that the belts 28 and 32 are driven in synchronism by any suitable means in order to avoid interference of the spindles mounted on these belts with each other and to insure that the upwardly moving spindles on one belt oppose the upwardly moving saw-toothed members on the other belt, and that each substantially horizontal row of spindles on the belt 28 will be located substantially midway between a pair of substantially horizontal rows of spindles on the belt 32 on the upwardly moving runs of the belts as they strip the cotton bolls from the stalks.

It is to be understood that the above description is merely illustrative and in nowise limiting and that we desire to comprehend within this invention such modifications as are comprehended within the scope of the appended claims.

We claim:

1. In a cotton picker machine, including a pair of cotton picking belt units comprising flights, each of said upwardly traveling belt flights being in opposed position facing each other, said upwardly traveling flights having surfaces which extend from front to rear of said machine, said belt surfaces of each belt having a plurality of spaced spindles projecting therefrom, at least one of said belt surfaces having a plurality of members provided with tooth means, said last named members projecting a lesser distance than said spindles toward the upwardly traveling flight of the other belt, whereby the said spindles strip the cotton from the stalks and bring the cotton into contact with said members while simultaneously guiding the stalks from the advancing to the trailing ends of said units while said members provided with tooth means engage the lint cotton brought in contact with said members by said spindles, and means located adjacent the tops of the said flights of said belts for removing the lint cotton from said members, at least some of said members with tooth means on one upwardly traveling flight being opposed to at least some of said spindles on the upwardly traveling flight of the other belt.

2. In a cotton picker machine, including a pair of cotton picking belt units comprising flights, each of said upwardly traveling belt flights being in opposed position facing each other, said upwardly traveling flights having surfaces which extend from front to rear of said machine, said belt surfaces of each belt having a plurality of spaced spindles projecting therefrom, at least one of said belt surfaces having a plurality of members provided with tooth means, said last named members projecting a lesser distance than said spindles toward the upwardly traveling flight of the other belt, whereby the said spindles strip the cotton from the stalks and bring the cotton into contact with said members while simultaneously guiding the stalks from the advancing to the trailing ends of said units while said members provided with tooth means engage the lint cotton brought in contact with said members by said spindles, and means located adjacent the tops of said flights of said belts for removing the lint cotton from said members, said spindles being mounted in rows which are inclined to a horizontal line extending at right angles to the movement of the belt, at least some of said members with tooth means on one upwardly traveling flight being opposed to at least some of said spindles on the upwardly traveling flight of the other belt.

3. In a cotton picker machine, including a pair of cotton picking belt units comprising flights, each of said upwardly traveling belt flights being in opposed position facing each other, said upwardly traveling flights having surfaces which extend from front to rear of said machine, said belt surfaces of each belt having a plurality of spaced spindles projecting therefrom, at least one of said belt surfaces having a plurality of members provided with tooth means, said last named members projecting a lesser distance than said spindles toward the upwardly traveling flight of the other belt, whereby the said spindles strip the cotton from the stalks and bring the cotton into contact with said members while simultaneously guiding the stalks from the advancing to the trailing ends of said units while said members provided with tooth means engage the lint cotton brought in contact with said members by said spindles, and means located adjacent the tops of the said flights of said belts for removing the lint cotton from said members, said members provided with tooth means being mounted in rows on at least one of said belts, said rows being inclined to horizontal lines extending at right angles to the movement of the belt, at least some of said members with tooth means on one upwardly traveling flight being opposed to at least some of said spindles on the upwardly traveling flight of the other belt.

4. In a cotton picker machine, including a pair of cotton picking belt units comprising flights, each of said upwardly traveling belt flights being in opposed position facing each other, said upwardly traveling flights having surfaces which extend from front to rear of said machine, said belt surfaces of each belt having a plurality of spaced spindles projecting therefrom, at least one of said belt surfaces having a plurality of members provided with tooth means, said last named members projecting a lesser distance than said spindles toward the upwardly traveling flight of the other belt, whereby the said spindles strip the cotton from the stalks and bring the cotton into contact with said members while simultaneously guiding the stalks from the advancing to the trailing ends of said units while said members provided with tooth means engage the lint cotton brought in contact with said members by said spindles, and means located adjacent the tops of the said flights of said belts for removing the lint cotton from said members, said members and said spindles being mounted in rows on said belts, said rows being inclined to horizontal lines extending at right angles to the movement of said belts, at least some of said members with tooth means on one upwardly traveling flight being opposed to at least some of said spindles on the upwardly traveling flight of the other belt.

5. In a cotton picker machine, including a pair of cotton picking belt units comprising flights, each of said upwardly traveling belt flights being in opposed position facing each other, said upwardly traveling flights having surfaces which extend from front to rear of said machine, said belt surfaces of each belt having a plurality of spaced spindles projecting therefrom, at least one of said belt surfaces having a plurality of members provided with tooth means, said last named members projecting a lesser distance than said spindles toward the upwardly traveling flight of the other belt, whereby the said spindles strip the cotton from the stalks and bring the cotton into contact with said members while simultaneously guiding the stalks from the advancing to the trailing ends of said units while said members provided with tooth means engage the lint cotton brought in contact with said members by said spindles, and means located adjacent the tops of the said flights of said belts for removing the lint cotton from said members, said spindles being mounted in rows on each belt and the spindles of each row on one belt being vertically spaced from each other and from the vertical row on the other belt of the upwardly moving runs of said belts, at least some of said members with tooth means on one upwardly traveling flight being opposed to at least some of said spindles on the upwardly traveling flight of the other belt.

6. In a cotton picker machine, including a pair of cotton picking belt units comprising flights, each of said upwardly traveling belt flights being in opposed position facing each other, said upwardly traveling flights having surfaces which extend from front to rear of said machine, said belt surfaces of each belt having a plurality of spaced spindles projecting therefrom, at least one of said belt surfaces having a plurality of members provided with tooth means, said last named members projecting a lesser distance than said spindles toward the upwardly traveling flight of the other belt, whereby the said spindles strip the cotton from the stalks and bring the cotton into contact with said members while simultaneously guiding the stalks from the advancing to the trailing ends of said units while said members provided with tooth means engage the lint cotton brought in contact with said members by said spindles, and means located adjacent the tops of the said flights of said belts for removing the lint cotton from said members, said members each comprising a row of sawteeth extending vertically on the upwardly moving run of at least one of said belts, at least some of said members with tooth means on one upwardly traveling flight being opposed to at least some of said spindles on the upwardly traveling flight of the other belt.

7. In a cotton picker machine, including a pair of cotton picking belt units comprising flights, each of said upwardly traveling belt flights being in opposed position facing each other, said upwardly traveling flights having surfaces which extend from front to rear of said machine, said belt surfaces of each belt having a plurality of spaced spindles projecting therefrom, at least one of said belt surfaces having a plurality of members provided with tooth means, said last named members projecting a lesser distance than said spindles toward the upwardly traveling flight of the other belt, whereby the said spindles strip the cotton from the stalks and bring the cotton into contact with said members while simultaneously guiding the stalks from the advancing to the trailing ends of said units while said members provided with tooth means engage the lint cotton brought in contact with said members by said spindles, and means located adjacent the tops of the said flights of said belts for removing the lint cotton from said members, said spindles being mounted in rows which are inclined to a horizontal line extending at right angles to the movement of the belt, said members each comprising a row of sawteeth extending vertically on the upwardly moving run of at least one of said belts, at least some of said members with tooth means on one upwardly traveling flight being opposed to at least some of said spindles on the upwardly traveling flight of the other belt.

8. In a cotton picker machine, including a pair of cotton picking belt units comprising flights, each of said upwardly traveling belt flights being in opposed position facing each other, said upwardly traveling flights having surfaces which extend from front to rear of said machine, said belt surfaces of each belt having a plurality of spaced spindles projecting therefrom, at least one of said belt surfaces having a plurality of members provided with tooth means, said last named members projecting a lesser distance than said spindles toward the upwardly traveling flight of the other belt, whereby the said spindles strip the cotton from the stalks and bring the cotton into contact with said members while simultaneously guiding the stalks from the advancing to the trailing ends of said units while said members provided with tooth means engage the lint cotton brought in contact with said members by said spindles, and means located adjacent the tops of the said flights of said belts for removing the lint cotton from said members, said members provided with tooth means being mounted in rows on at least one of said belts, said rows being inclined to horizontal lines extending at right angles to the movement of the belt, said members each comprising a row of sawteeth extending vertically on the upwardly moving run of at least one of said belts, at least some of said members with tooth means on one upwardly traveling flight being opposed to at least some of said spindles on the upwardly traveling flight of the other belt.

9. In a cotton picker machine, including a pair of cotton picking belt units comprising flights, each of said upwardly traveling belt flights being in opposed position facing each other, said upwardly traveling flights having surfaces which extend from front to rear of said machine, said belt surfaces of each belt having a plurality of spaced spindles projecting therefrom, at least one of said belt surfaces having a plurality of members provided with tooth means, said last named members projecting a lesser distance than said spindles toward the upwardly traveling flight of the other belt, whereby the said spindles strip the cotton from the stalks and bring the cotton into contact with said members while simultaneously guiding the stalks from the advancing to the trailing ends of said units while said members provided with tooth means engage the lint cotton brought in contact with said members by said spindles, and means located adjacent the tops of the said flights of said belts for removing the lint cotton from said members, said members and said spindles being mounted in rows on said belts, said rows being inclined to horizontal lines extending at right angles to the movement of said belts, said members each comprising a row of sawteeth extending vertically on the upwardly moving run of at least one of said belts, at least some of said members with tooth means on one upwardly traveling flight being opposed to at least some of said spindles on the upwardly traveling flight of the other belt.

10. In a cotton picker machine, including a pair of cotton picking belt units comprising flights, each of said upwardly traveling belt flights being in opposed position facing each other, said upwardly traveling flights having surfaces which extend from front to rear of said machine, said belt surfaces of each belt having a plurality of spaced spindles projecting therefrom, at least one of said belt surfaces having a plurality of members provided with tooth means, said last named members projecting a lesser distance than said spindles toward the upwardly traveling flight of the other belt, whereby the said spindles strip the cotton from the stalks and bring the cotton into contact with said members while simultaneously guiding the stalks from the advancing to the trailing ends of said units while said members provided with tooth means engage the lint cotton brought in contact with said members by said spindles, and means located adjacent the tops of the said flights of said belts for removing the lint cotton from said members, said spindles being mounted in rows on each belt and the spindles of each row on one belt being vertically spaced from each other and from the vertical row on the other belt of the upwardly moving runs of said belts, said members each comprising a row of sawteeth extending vertically on the upwardly moving run of at least one of said belts, at least some of said members with tooth means on one upwardly traveling flight being opposed to at least some of said spindles on the upwardly traveling flight of the other belt.

11. In a cotton picker machine, including a pair of cotton picking belt units comprising flights, each of said upwardly traveling belt flights being in opposed position facing each other, said upwardly traveling flights having surfaces which extend from front to rear of said machine, said belt surfaces of each belt having a plurality of spaced spindles projecting therefrom, at least one of said belt surfaces having a plurality of members provided with tooth means, said last named members projecting a lesser distance than said spindles toward the upwardly traveling flight of the other belt, whereby the said spindles strip the cotton from the stalks and bring the cotton into contact with said members while simultaneously guiding the stalks from the advancing to the trailing ends of said units while said members provided with tooth means engage the lint cotton brought in contact with said members by said spindles, and means located adjacent the tops of the said flights of said belts for removing the lint cotton from said members, said removing means including a first brush for removing cotton from said members, a receptacle and a second brush located between said first brush and said receptacle, at least some of said members with tooth means on one upwardly traveling flight being opposed to at least some of said spindles on the upwardly traveling flight of the other belt.

12. In a cotton picker machine, including a pair of cotton picking belt units comprising flights, each of said upwardly traveling belt flights being in opposed position facing each other, said upwardly traveling flights having surfaces which extend from front to rear of said machine, said belt surfaces of each belt having a plurality of spaced spindles projecting therefrom, at least one of said belt surfaces having a plurality of members provided with tooth means, said last named members projecting a lesser distance than said spindles toward the upwardly traveling flight of the other belt, whereby the said spindles strip the cotton from the stalks and bring the cotton into contact with said members while simultaneously guiding the stalks from the advancing to the trailing ends of said units while said members provided with tooth means engage the lint cotton brought in contact with said members by said spindles, and means located adjacent the tops of the said flights of said belts for removing the lint cotton from said members, said removing means including a first brush for removing cotton from said members, a receptacle and a second brush located between said first brush and said receptacle, and driving means for rotating said brushes in opposite directions, at least some of said members with tooth means on one upwardly traveling flight being opposed to at least some of said spindles on the upwardly traveling flight of the other belt.

13. In a cotton picker machine, including a pair of cotton picking belt units comprising flights, each of said upwardly traveling belt flights being in opposed position facing each other, said upwardly traveling flights having surfaces which extend from front to rear of said machine, said belt surfaces of each belt having a plurality of spaced spindles projecting therefrom, at least one of said belt surfaces having a plurality of members provided with tooth means, said last named members projecting a lesser distance than said spindles toward the upwardly traveling flight of the other belt, whereby the said spindles strip the cotton from the stalks and bring the cotton into contact with said members while simultaneously guiding the stalks from the advancing to the trailing ends of said units while said members provided with tooth means engage the lint cotton brought in contact with said members by said spindles, and means located adjacent the tops of the said flights of said belts for removing the lint cotton from said members, said members each comprising a row of sawteeth extending vertically on the upwardly moving run of at least one of said belts, said removing means including a pair of brushes and driving means for rotating said brushes in opposite directions, a casing and pneumatic means for removing cotton from said casing as deposited by said brushes, at least some of said members with tooth means on one upwardly traveling flight being opposed to at least some of said spindles on the upwardly traveling flight of the other belt.

LLOYD H. HAMNER.
JAMES HENRY HAMNER.
JAMES CARL HAMNER.

REFERENCES CITED

The following references are of record in the file of this patent:

UNITED STATES PATENTS

| Number | Name | Date |
|---|---|---|
| 24,609 | Bishop | July 5, 1859 |
| 594,481 | Martin | Nov. 30, 1897 |
| 1,763,646 | Callahan | June 17, 1930 |
| 1,778,587 | Crumley | Oct. 14, 1930 |
| 1,859,144 | Johnston | May 17, 1932 |